(12) United States Patent
Radlowski et al.

(10) Patent No.: US 9,566,572 B2
(45) Date of Patent: *Feb. 14, 2017

(54) METHOD OF MAKING HYDROPROCESSING CATALYST

(71) Applicant: Advanced Refining Technologies LLC, Columbia, MD (US)

(72) Inventors: Cecelia A. Radlowski, Riverside, IL (US); Gill M. Malick, Orland Park, IL (US); Colleen T. Miedona, Monee, IL (US)

(73) Assignee: Advanced Refining Technologies LLC, Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/001,636

(22) Filed: Jan. 20, 2016

(65) Prior Publication Data

US 2016/0136623 A1    May 19, 2016

Related U.S. Application Data

(63) Continuation of application No. 14/495,327, filed on Sep. 24, 2014, now Pat. No. 9,248,438, which is a continuation of application No. 12/086,535, filed as application No. PCT/US2006/046947 on Dec. 11, 2006, now Pat. No. 8,877,671.

(60) Provisional application No. 60/714,545, filed on Dec. 14, 2005.

(51) Int. Cl.
| | |
|---|---|
| *B01J 27/19* | (2006.01) |
| *B01J 23/882* | (2006.01) |
| *B01J 37/02* | (2006.01) |
| *B01J 31/34* | (2006.01) |
| *C10G 45/10* | (2006.01) |
| *B01J 37/08* | (2006.01) |

(52) U.S. Cl.
CPC .............. *B01J 27/19* (2013.01); *B01J 23/882* (2013.01); *B01J 31/34* (2013.01); *B01J 37/0203* (2013.01); *B01J 37/0213* (2013.01); *B01J 37/08* (2013.01); *C10G 45/10* (2013.01); *B01J 2231/641* (2013.01)

(58) Field of Classification Search
CPC ...................................................... B01J 27/19
See application file for complete search history.

(56) References Cited

U.S. PATENT DOCUMENTS

| | | | |
|---|---|---|---|
| 4,382,854 A | 5/1983 | Wilson et al. | |
| 4,879,265 A | 11/1989 | Simpson et al. | |
| 5,200,381 A * | 4/1993 | Kamo | B01J 23/85 |
| | | | 502/170 |
| 5,468,709 A * | 11/1995 | Yamaguchi | B01J 23/85 |
| | | | 208/216 PP |
| 6,127,299 A | 10/2000 | de Boer et al. | |
| 6,290,841 B1 | 9/2001 | Gabrielov et al. | |
| 8,877,671 B2 * | 11/2014 | Radlowski | B01J 23/882 |
| | | | 502/167 |
| 9,248,438 B2 * | 2/2016 | Radlowski | B01J 23/882 |

FOREIGN PATENT DOCUMENTS

| | | |
|---|---|---|
| EP | 0181035 A2 | 5/1986 |
| EP | 0482817 A1 | 4/1992 |
| EP | 0482818 A1 | 4/1992 |
| EP | 1418002 A2 | 5/2004 |
| EP | 1733787 A1 | 12/2006 |
| JP | 06-339635 A | 12/1994 |
| JP | 09155197 A | 6/1997 |
| JP | 2000313890 A | 11/2000 |
| JP | 2003284958 A | 10/2003 |
| JP | 2004290728 A | 10/2004 |
| JP | 2005238128 A | 9/2005 |
| WO | 9641848 A1 | 12/1996 |
| WO | 2004054712 A1 | 7/2004 |
| WO | 2005035691 A1 | 4/2005 |
| WO | 2005084799 A1 | 9/2005 |
| WO | 2005092498 A1 | 10/2005 |

OTHER PUBLICATIONS

Supplementary European Search Report, EP 06839237, dated Mar. 11, 2010.
Takashi Fujikawa, Masahiro Kato, Hiroshi Kimura, Kazuvuki Kirivama, Minoru Hashimoto and Nobumasa Nakajima: Development of Highly Active Co-Mo Catalysts with Phosphorus and Citric Acid for Ultra-Jeep Desulfurization of Diesel Fractions (Part 1) Preparation and Performance of Catalysts Journal of the Japan Petroleum Institute, vol. 48, No. 2, Mar. 2005 (Mar. 2005), pp. 106-113, XP002567627.
Office Action from Russian Applcation No. 2008128450/04 dated Apr. 14, 2010.
Sun et al, The effects of fluorine, phosphate and chelating agents on hydrotreating catalysts and catalysis, 2003, aatalysis today, 86, pp. 173-189.
Editorial committee of Chemistry, Unabridged, Chemistry, Unabridged, Kyoritsu Shuppan Co., Ltd., Apr. 20, 2066, pp. 221-222.
Valencia D. et al., Citric acid loading for MoS2-based catalysts supported on SBA-15. New catalytic materials with high hydrogenolysis ability in hydrodesulfurization, Applied Catalysis B: Environmental, Elsevier, Jan. 17, 2013, vol. 129, pp. 137-145.
Database WPI Week 199509, Thomson Scientific. London, GB; AN 1995-063417 XP002567626, & JP 6 339635 A (Japan Energy Corp) Dec. 13, 1994 (Dec. 13, 1994) * abstract *.
Fujishige, S. , "Thermal Decomposition of Solid State Poly(-L-Malic Acid)", Journal of Thermal Analysis and Calorimetry, vol. 70, 2002, pp. 861-865.

(Continued)

*Primary Examiner* — Melvin C Mayes
*Assistant Examiner* — Stefanie Cohen
(74) *Attorney, Agent, or Firm* — Lerner, David, Littenberg, Krumholz & Mentlik, LLP

(57) ABSTRACT

A chelated hydroprocessing catalyst exhibiting low moisture is obtained by heating an impregnated, calcined carrier to a temperature higher than 200° C. and less than a temperature and for a period of time that would cause substantial decomposition of the chelating agent.

15 Claims, No Drawings

(56) References Cited

OTHER PUBLICATIONS

Wyrzykowski, D. et al., "Thermal behaviour of citric acid and isomeric aconitic acids", J. Therm Anal Calorim, No. 104, Aug. 2011, pp. 731-735.
Reference A. Editorial Committee of Chemistry, Unabridged, Chemistry Unabridged, Kyoritsu Shuppan Co., Ltd., Apr. 20, 1966, pp. 21-22.
Notice of opposition to a European patent dated May 27, 2015 for Patent No. EP19600101.
Response to Notice of Opposition for patent No. EP1960101, dated Jan. 20, 2016.

* cited by examiner

METHOD OF MAKING HYDROPROCESSING CATALYST

CROSS REFERENCE TO RELATED APPLICATIONS

This application is a continuation of U.S. application Ser. No. 14/495,327 filed on Sep. 24, 2014, now U.S. Pat. No. 9,248,438, which is a continuation of U.S. application Ser. No. 12/086,535, filed on Aug. 21, 2009, now U.S. Pat. No. 8,877,671 issued Nov. 4, 2014, which application is a national stage of PCT/US06/46947 filed Dec. 11, 2006, which application claims the benefit of Provisional Application No. 60/714,545, filed Dec. 14, 2005, the disclosures of which are hereby incorporated herein by reference.

BACKGROUND

This patent relates to catalysts supported on a foraminous carrier and methods for preparing such catalysts using stabilized aqueous compositions. In particular, this patent relates to aqueous compositions containing catalytically-active metal components and substantially water soluble acidic components and to the catalysts prepared using such aqueous compositions for impregnating foraminous carriers. It is desirable to convert heavy hydrocarbon feeds, including those having a boiling point below about 1200° F., into lighter, and more valuable, hydrocarbons. It is also desirable to treat hydrocarbon feedstocks, including petroleum residues, also known as resid feedstocks, in order to carry out, for example, hydrodesulfurization (HDS), hydrodenitrogenation (HDN), carbon residue reduction (CRR), hydrodemetallation (HDM), including the removal of nickel compounds (HDNi) and vanadium compounds (HDV). The catalysts of the present invention are particularly useful and effective in the hydrodesulfurization, hydrodenitrogenation, hydrodemetallation, etc. of petroleum compositions, including high-boiling petroleum compositions.

Catalysts comprising at least one Group VIII metal component, at least one Group VIB metal component and a phosphorus component, such components being carried on a foraminous carrier, are known in the art.

It is known that the metals of Group VIB of the periodic table, for example, tungsten and molybdenum, and components comprising such metals, for example, compounds such as the oxides and sulfides, are active in catalyzing a wide variety of reactions including among others, hydrogenation, dehydrogenation, oxidation, desulfurization, denitrogenation, isomerization and cracking. However, catalytic metals and components containing them are relatively costly and have a relatively small surface area per unit weight, so that they are typically not used without resort to carrier materials. Consequently, these catalytically active metals or components are usually applied in a diluted form to the surface of a foraminous support material. The foraminous support material is usually of a lower order of activity when compared to the catalytically-active components, or such carriers may even be catalytically completely inactive.

Furthermore, it is known that certain metal-containing components of Group VIII of the periodic table of the elements, such as iron, cobalt, and nickel, when used in combination with the Group VIB metal-containing components, result in enhanced catalytic activity. These Group VIII components are sometimes referred to as catalyst "promoters." However, problems can result when these promoters are attempted to be impregnated into a carrier along with the catalytically active components of Group VIB. Simple and direct impregnation techniques using a mixture of both components typically cannot be employed. For example, a combination of components based on cobalt or nickel salts with molybdenum or tungsten components typically results in unstable solutions, e.g., solutions subject to the formation of precipitates Impregnation of a carrier using separate solutions comprising components of Group VIB and Group VIII is not an acceptable alternative since that can result in costly, multi-step processes and ineffective or non-uniform metals distribution.

Rather costly and involved processes have been devised in order to obtain a uniform distribution throughout the available surface area of the foraminous catalyst carrier material when using components containing both of the catalytically active metals of Group VIB and Group VIII. It has been the objective of these methods to prepare solutions containing metals of both Group VIB and Group VIII that are sufficiently concentrated and of the requisite stability to allow subsequent uniform impregnation and distribution of the metals throughout and upon the surface area of the carrier. These methods typically include the use of high concentrations of phosphoric acid. Typically, the carrier is impregnated with a dilute solution comprising a phosphorus component, although some applications do not use a phosphorus component, and components of metals of both Group VIB and Group VIII, by applying the solution to a calcined foraminous carrier material, and then drying and calcining the composite to convert the catalytically active material to other forms, particularly to the oxide. However, the use of phosphoric acid, particularly at high concentrations that are required to readily solubilize both of the metal containing components and maintain them in a stable solution, can introduce performance related problems during the use of such catalysts in hydroconversion processes.

Furthermore, there is increased interest in producing very low sulfur and nitrogen crude oil fractions and in producing and upgrading lower quality hydrocarbon feeds, such as synthetic crudes and heavy petroleum crude oil fractions. Unfortunately, high concentrations of nitrogen, sulfur, metals and/or high boiling components, for example, asphaltenes and resins, in such lower quality feeds render the same poorly suited for conversion to useful products in conventional petroleum refining operations. In view of such difficulties, lower quality hydrocarbon feeds often are catalytically hydrotreated to obtain materials having greater utility in conventional downstream refining operations. Catalytic hydrotreating or hydroconversion involves contacting such a feed with hydrogen at elevated temperature and pressure in the presence of suitable catalysts. As a result of such processing, sulfur and nitrogen in the feed are converted largely to hydrogen sulfide and ammonia which are easily removed. Aromatics saturation and cracking of larger molecules can also be used in order to convert high boiling feed components to lower boiling components. Metals content of the feed decreases as a result of deposition of metals on the hydrotreating catalyst.

As can be appreciated, satisfactory operation in processing feeds containing high levels of impurities under severe process conditions places increased demands on the catalyst to be employed as the same must exhibit not only high activity in the presence of impurities and under severe conditions, but also stability and high activity maintenance during the time that it is in use. Catalysts containing a Group VIB metal component, such as a molybdenum and/or tungsten component, promoted by a nickel and/or cobalt component and supported on a porous refractory inorganic oxide, are well known and widely used in conventional hydrotreating processes; however, the same often are somewhat lacking in stability and activity maintenance under severe conditions.

It is known that preparation of hydrotreating catalysts containing Group VIB and Group VIII metal components supported on a porous refractory inorganic oxide can be improved through the use of phosphoric acid impregnating solutions of precursors to the Group VIB and Group VIII metal components or the use of phosphoric acid as an impregnation aid for the metal precursors. Thus, Pessimisis, U.S. Pat. No. 3,232,887 discloses stabilization of Group VIB and Group VIII metal-containing solutions through the use of water-soluble acids. According to the patentee, in column 3, lines 6-11, "in its broadest aspect the invention comprises the preparation of stabilized aqueous solutions which comprise an aqueous solvent having dissolved therein catalytically active compounds containing at least one element from Group VIB of the periodic table and one element from Group VIII." Inorganic oxyacids of phosphorus are included among the disclosed stabilizers, and the examples of Pessimisis illustrate preparation of various cobalt-molybdenum, nickel-molybdenum, and nickel-tungsten catalysts using phosphorus and other acids as stabilizers. Hydrodesulfurization results with certain of the cobalt-molybdenum catalysts are presented, and the patentee suggests that the use of the stabilized solutions may lead to improved hydrodesulfurization activity in some instances.

Other patents relating to hydroconversion or hydrotreating processes disclose various catalysts, their method of preparation as well as their use in such processes. For example, Simpson et al., U.S. Pat. No. 4,500,424 and its divisional patent, U.S. Pat. No. 4,818,743 are directed to hydrocarbon conversion catalysts containing at least one Group VIB metal component, at least one Group VIII metal component, and a phosphorus component on a porous refractory oxide having a defined and narrow pore size distribution. The catalyst is said to be useful for promoting various hydrocarbon conversion reactions, particularly hydrodesulfurization. Similarly, Nelson et al., U.S. Pat. No. 5,545,602 is directed to hydrotreatment of heavy hydrocarbons to increase content of components boiling below 1000° F. by contact with Group VIII non-noble metal oxide and Group VIB metal oxide on alumina having specific and defined surface area and pore size distribution. This patent also teaches, at column 9, lines 36-37, to avoid adding phosphorus-containing components during catalyst preparation because "Presence of phosphorus undesirably contributes to sediment formation." In furtherance of this teaching it is suggested, at lines 54-57, that impregnating solutions may be stabilized with $H_2O_2$ so that solutions stabilized with $H_3PO_4$ not be used. See also Dai et al., U.S. Pat. Nos. 5,397,956 and 5,498,586 similarly directed to defined carrier properties for improved hydroconversion catalysts.

In the catalysts of the present invention, the metals are typically activated by converting them into the corresponding metal sulfides. This can be accomplished by introducing the catalyst comprising the impregnated metals in a device or reactor and conducting a suitable pre-sulfurization treatment, wherein the catalyst layer is sulfurized by introducing a hydrocarbon oil containing an appropriate sulfurizing agent at elevated temperature. The active site of the thus-pretreated catalyst is formed on the surfaces of the resulting active metal sulfides so that the total number of active sites increases with an increase in the exposed surface area of the active metal sulfides, yielding a high catalyst activity. An increase in exposed surface area of the active metal sulfides may be attained by enhancing dispersion of the active metal sulfides as carried on the catalyst carrier or by minimizing the crystal size of the respective active metal sulfides. Methods for preparing such a catalyst include dipping a catalyst carrier in an aqueous solution of active metals containing a carboxylic acid, such as citric acid or malic acid, as a complexing or chelating agent for active metals and thereafter firing the impregnated carrier. For example, EP 0181035(A2) discloses a method of preparing a catalyst in which an organic compound having a nitrogen-containing ligand (e.g., amino group, cyano group) such as nitriloacetic acid, ethylenediaminetetraacetic acid or diethylenetriamine is used as a complexing agent and is added to an aqueous solution of active metals, a catalyst carrier such as an alumina or silica is dipped in the resulting aqueous solution of active metals, and the catalyst composed of active metals carried on the catalyst carrier is then dried at a temperature of not higher than 200° C. without firing. Similar methods are disclosed in U.S. Pat. No. 5,200,381 wherein the complexing agent is a hydroxycarboxylic acid, for example citric acid, and the agent is used in solution with the active metals and the resulting impregnated carrier is kneaded and shaped; or in U.S. Pat. No. 5,232,888 the agent is added to a catalyst already containing the active metals deposited on a carrier. In both of these patents the resulting composition is heated and dried at a temperature not higher than 200° C., and in the absence of calcination, in order to avoid decomposition of the complexing agent.

In accordance with the method of adding a hydroxycarboxylic acid as a complexing agent followed by firing, the acid can be effective for increasing the stability of the active metal-dipping solution as it acts as a complexing agent for active metals and additionally the acid is also effective for inhibiting coagulation of active metals. However, the active metals are subject to coagulation because of the final firing step thereby tending to decrease catalyst activity. On the other hand, in accordance with the method disclosed in EP 0181035(A2), since the active metal ions such as Mo or Ni ions are firmly coordinated with the nitrogen-containing compound, such ions are carried on the carrier in a highly dispersed condition. In addition, since the catalyst containing the active metals is not calcined but is merely dried at a low temperature, not higher than 200° C., and since sulfurization is conducted with unoxidized metals, the active metals can be maintained in a dispersed state. While such catalysts exhibit desirably high activity, they are deficient in that the low temperature heating and drying step does not remove sufficient water, thereby requiring that such water be removed during the initial stages of hydroprocessing, an undesirable and burdensome characteristic. In particular, the water driven off at this early stage in the use of the catalyst can place an undue burden on plant equipment that separates water from the processed petroleum fractions.

Notwithstanding the diverse teachings of patents and publications in respect of the preparation of hydroprocessing or hydrotreating catalysts, there is a continuing need for development of improved catalysts, particularly catalysts that are effective but contain lower levels of moisture as delivered to the petroleum processor.

SUMMARY OF THE INVENTION

Embodiments of the invention comprise a hydroprocessing catalyst and method for preparing such catalyst comprising: (I) providing at least the following components: (A) at least one calcined foraminous carrier having a water pore volume; (B) catalytically active metals useful in hydroprocessing hydrocarbons, said metals in the form of at least one component providing at least one metal from Group VIB of the periodic table and at least one component providing at least one metal from Group VIII of the periodic table; (C) at least one chelate; (D) water in a quantity sufficient to form a solution or dispersion comprising said catalytically active metals and said at least one chelate; and (E) optionally, at least one phosphorus-containing acidic component; (II) contacting said components (I)(A) with said solution or dispersion comprising (I)(B), (I)(C) and optionally (I)(E) for a time and at a temperature sufficient to form a mixture and to impregnate said carrier with a suitable amount of said components (I)(B) and (I)(C); (III) to the extent that the volume of said solution or dispersion equals or exceeds the water pore volume of said carrier separating said impregnated carrier; and (IV) heating said impregnated carrier to a temperature higher than 200° C. and less than a temperature and for a period of time that would cause substantial decomposition of said at least one chelate. An exceptionally dry catalyst having desirable activity is obtained even in the absence of calcining following impregnation.

DETAILED DESCRIPTION OF THE INVENTION

In the specification and in the claims, the singular forms "a", an and the include the plural unless the context clearly dictates otherwise. For purposes of the present invention, unless otherwise defined with respect to a specific property, characteristic or variable, the term "substantially" as applied to any criteria, such as a property, characteristic or variable, means to meet the stated criteria in such measure such that one skilled in the art would understand that the benefit to be achieved, or the condition or property value desired is met. The term "about" when used as a modifier for, or in conjunction with, a variable, is intended to convey that the numbers and ranges disclosed herein are flexible and that practice of the present invention by those skilled in the art using, e.g., temperatures, concentrations, amounts, contents, carbon numbers, properties such as particle size, surface area, pore diameter, pore volume, bulk density, etc., that are outside of the range or different from a single value, will achieve the desired result, namely, an effective hydroprocessing catalyst exhibiting lower levels of moisture as made compared to catalysts of the prior art comprising similar active metals and other components and heated without calcining.

Throughout the entire specification, including the claims, the word "comprise" and variations of the word, such as "comprising" and "comprises," as well as "have," "having," "includes," "include" and "including," and variations thereof, means that the named steps, elements or materials to which it refers are essential, but other steps, elements or materials may be added and still form a construct within the scope of the claim or disclosure. When recited in describing the invention and in a claim, it means that the invention and what is claimed is considered to be what follows and potentially more. These terms, particularly when applied to claims, are inclusive or open-ended and do not exclude additional, unrecited elements or methods steps.

All references herein to elements or metals belonging to a certain Group refer to the Periodic Table of the Elements and Hawley's Condensed Chemical Dictionary, 13$^{th}$ Edition. Also, any references to the Group or Groups shall be to the Group or Groups as reflected in this Periodic Table of Elements using the CAS system for numbering groups.

The general procedures for preparing impregnating solutions of catalytically active metals are described in detail by D. Klein in patent application US 2005/0109674, published May 26, 2005, which is a continuation in part of application Ser. No. 10/719,551, filed Nov. 20, 2003. The content of each of these published and filed applications is incorporated herein.

"Post-impregnated" catalyst refers to a catalyst in which the metals-containing solution or solutions are added after the foraminous catalyst carrier is calcined. The foraminous catalyst carrier can be calcined before or after shaping of the catalyst particle, but the important aspect is that the metals-containing solution or solutions be added after the carrier material is calcined. Thus, a "post-impregnated" catalyst can be made as follows:

Uncalcined pseudoboehmite alumina powder is thoroughly mixed with water, or optionally with a dilute aqueous solution of nitric acid or an organic acid such as acetic or formic acid, and the alumina mixture, containing about 50 to 65 weight percent moisture, is then formed into catalyst particles having a desired size and shape, preferably by extrusion. The formed particles are dried at a temperature of about 110 to about 150° C., and then calcined at a temperature of about 400 to about 750° C. for about one to two hours. The dried and calcined particles are contacted with a suitable quantity of a stable metals solution including a chelating agent as described in detail hereinbelow. For example, such solution typically contains molybdenum, nickel and phosphorus, or molybdenum, cobalt and phosphorus, plus an optional additional quantity of Group VIII metals solution, if required, in order to provide the desired amount of metals on the finished catalyst, while substantially and uniformly filling the pores. After a suitable contact time, the formed catalyst particles are heated at an elevated temperature as described in detail hereinbelow to effectively remove substantially all of the residual moisture without the need for calcining, thus preserving the chelating agent, typically present as an organic compound.

Suitable catalytically active elements or metals from Group VIII of the periodic table present in components of the invention may include Fe, Co, Ni, Pd, Pt and the like and mixtures thereof. Of these, the most preferable are Co and Ni. Suitable Group VIB elements or metals include Cr, Mo, W, and mixtures thereof; most preferred are Mo and W. Preferred combinations of metal components comprise, e.g., nickel and molybdenum, cobalt and molybdenum, tungsten and nickel or cobalt, molybdenum and a combination of cobalt and nickel, tungsten and a combination of nickel and cobalt, a combination of molybdenum and chromium and nickel, etc; the combination of molybdenum and nickel is particularly preferred.

The overall process for preparing a stable impregnating solution can be described as follows:

An amount of a substantially water-insoluble Group VIII metal component is added to water to form a slurry. The amount of the Group VIII metal component is low relative to the amount of the Group VIB metal component that will be added in a subsequent step. The specific amount of the substantially water-insoluble Group VIII metal component can be characterized by the molar ratio of the Group VIII metal to the Group VIB metal in the final impregnating solution; typically, the molar ratio is from about 0.05 to about 0.75; other suitable ranges of this variable and others are described below.

To the aqueous slurry of the substantially water-insoluble Group VIII metal component just described, is added an aqueous solution of a water-soluble, phosphorus-containing acidic component. The amount of this acidic phosphorus component is low relative to the amount of the Group VIB metal component that will be added in a subsequent step, and is at a level that may be insufficient to cause the Group VIII metal component to become substantially soluble at this stage of the process, although it is believed that the components added in these steps 1 and 2 undergo reaction. In any event, a slurry of the components is maintained at this stage. The specific amount of the water-soluble, phosphorus-containing acidic component can be characterized by the molar ratio of elemental phosphorus to the Group VIB metal in the final impregnating solution; typically this molar ratio is from about 0.01 to about 0.80.

To the aqueous slurry present at the end of step 2, is added the Group VIB metal component. In step 3 the resulting slurry mixture is heated for a time and to a temperature sufficient for the Group VIB metal component to react with the aqueous slurry produced by the substantially water-insoluble Group VIII metal component and the water-soluble, phosphorus-containing acidic component, and to form a solution. Generally, mixing and heating may be carried out over a period of about 1 to about 8 hours and at a temperature of about 160 to about 200° F.

The concentration of the Group VIB metal component in the impregnating solution composition can be quite high, up to about 50 weight percent, expressed as the oxide, and based on the total weight of the impregnating solution composition. It should be obvious to those skilled in the art that more dilute solutions, useful for particular applications, can be obtained by diluting the concentrated composition with a suitable amount of water.

Additional Group VIII metal, in the form of a substantially water-soluble Group VIII metal component, can be added to the compositions in step 4 as required to give the desired level of Group VIII metal component and the desired ratio of Group VIII metal component to Group VIB metal component in the finished catalyst. The molar ratio of Group VIII metal component to Group VIB metal component can thus be varied from about 0.05 to about 1.0.

Furthermore, a chelating agent, preferably citric acid, is added to the composition as well. Preferably the citric acid is added in two portions, one to the water prior to addition of the metals and a second, larger portion after addition of the metal compounds. Typically, the ratio of citric acid added at the beginning to that added at the end is about 1:99 to about 35:65; preferably about 20:80 to about 30:70. Where a split addition of the chelating agent is used, the second portion is added to the solution that is at a temperature typically of from about ambient to less than about 150° F.; preferably less than about 140° F.; more preferably less than about 130° F.

The catalyst impregnating compositions produced by the method described, allow for high concentrations of the Group VIB metal component at low relative concentrations of both the phosphorus and Group VIII metal components. The low relative concentration of the phosphorus component can be advantageous for the preparation of catalysts that can benefit from or tolerate a low level of phosphorus. Additionally, this catalyst impregnating solution is surprisingly stable, i.e., it can be stored for extended periods as a solution without the formation of precipitates.

The low relative concentration of the Group VIII metal component is advantageous for several reasons. First, the compositions allow for the preparation of catalysts with a wide range of ratios of Group VIII metal component to Group VIB metal component. Second, a substantial amount of the Group VIII metal component required for the finished catalyst can be added in the form of a substantially water-soluble Group VIII metal component that might otherwise be difficult to solubilize in the presence of a large amount of Group VIB metal component unless a significantly larger amount of the acidic phosphorus component was used. These substantially water-soluble Group VIII metal components, especially the salts of mineral acids (e.g., nitrates), can be more cost-effective than the substantially water-insoluble Group VIII metal component salts (e.g., carbonates). Third, controlled heating of the impregnated catalyst at elevated temperature facilitates removal of moisture from the catalyst without calcining, thus preserving the chelating agent and reducing the adverse impact of excessive moisture during start-up when the catalyst is used in hydroprocessing or hydroconversion operations. Fourth, as will be described and exemplified, the impregnating solution of the present invention can be used to produce a hydroconversion catalyst having excellent performance characteristics.

Suitable Group VIII metal components for use in the invention which are characterized herein as substantially insoluble in water include the citrates, oxalates, carbonates, hydroxy-carbonates, hydroxides, phosphates, phosphides, sulfides, aluminates, molybdates, tungstates, oxides, or mixtures thereof. Oxalates, citrates, carbonates, hydroxy-carbonates, hydroxides, phosphates, molybdates, tungstates, oxides, or mixtures thereof are preferred; most preferred are hydroxy-carbonates and carbonates. Generally, the molar ratio between the hydroxy groups and the carbonate groups in the hydroxy-carbonate is in the range of about 0-4; preferably about 0-2; more preferably about 0-1; and most preferably about 0.1-0.8. In particular, suitable substantially water insoluble components providing a Group VIII metal are the oxide, carbonates and hydroxides of nickel and cobalt.

Suitable substantially water-soluble components providing a Group VIII metal for use in the invention include salts, such as nitrates, hydrated nitrates, chlorides, hydrated chlorides, sulfates, hydrated sulfates, formates, acetates, or hypophosphite. Suitable substantially water-soluble nickel and cobalt components include nitrates, sulfates, acetates, chlorides, formates or mixtures thereof, as well as nickel hypophosphite. Suitable water-soluble iron components include iron acetate, chloride, formate, nitrate, sulfate or mixtures thereof. In particular, substantially water-soluble components are salts such as nickel and cobalt nitrates, sulfates, and acetates.

An indicator of the relative solubility of the substantially insoluble and soluble components can be found by comparing nickel carbonate to nickel nitrate or nickel sulfate. As reported in the CRC Handbook of Chemistry and Physics, $69^{th}$ Ed., 1988-9 (R. C. Weast, Ed., CRC Press), nickel carbonate has a solubility of about 0.009 g/100 mL of water whereas nickel nitrate has a solubility of about 239 g/100 mL and nickel sulfate a solubility of about 29-76 g/100 mL, depending on the water of hydration of the particular salt. Furthermore, the solubility of the sulfate salts increases to about 87-476 g/100 mL in hot water. Consequently, one skilled in the art will understand the reference to "substantial" with regard to water solubility of these components. Alternatively, for purposes of the present invention, the aqueous solubility of a substantially water insoluble Group VIII metal component is generally less than 0.05 moles/100 mL (at 18° C.); conversely, the solubility of a substantially water-soluble component is greater than 0.05 moles/100 mL, e.g., greater than about 0.10 moles/100 mL (at 18° C.).

Suitable components providing a Group VIB metal include both substantially water-soluble and substantially water insoluble components. Suitable substantially water-soluble Group VIB metal components include Group VIB metal salts such as ammonium or alkali metal monomolybdates and tungstates as well as water-soluble isopoly-compounds of molybdenum and tungsten, such as metatungstic acid, and metatungstate salts, or water-soluble heteropoly compounds of molybdenum or tungsten comprising further, e.g., P, Si, Ni, or Co or combinations thereof. Suitable substantially water-soluble isopoly- and heteropoly compounds are given in Molybdenum Chemicals, Chemical data series, Bulletin Cdb-14, February 1969 and in Molybdenum Chemicals, Chemical data series, Bulletin Cdb-12a-revised, November 1969. Suitable substantially water-soluble chromium compounds include chromates, isopolychromates and ammonium chromium sulfate. Suitable Group VIB metal components that are substantially water insoluble, e.g., having a low solubility in water, include di- and trioxides, carbides, nitrides, aluminium salts, acids, sulfides, or mixtures thereof. Preferred substantially insoluble Group VIB metal components are di- and trioxides, acids, and mixtures thereof. Suitable molybdenum components include molybdenum di- and trioxide, molybdenum sulfide, molybdenum carbide, molybdenum nitride, aluminium molybdate, molybdic acids (e.g. $H_2MoO_4$), ammonium phosphomolybdate, ammonium di- and hepta-molybdate, or mixtures thereof; molybdic acid and molybdenum di- and trioxide are preferred. Suitable substantially insoluble tungsten components include tungsten di- and trioxide, tungsten sulfide ($WS_2$ and $WS_3$), tungsten carbide, orthotungstic acid ($H_2WO_4.H_2O$), tungsten nitride, aluminium tungstate (also meta- or polytungstate), ammonium phosphotungstate, or mixtures thereof; ammonium metatungstate, orthotungstic acid and tungsten di- and trioxide are preferred. Most preferred is molybdenum trioxide, $MoO_3$. For purposes of the present invention, the aqueous solubility of a substantially water insoluble Group VIB metal component is generally less than 0.05 moles/100 mL (at 18° C.); conversely, the solubility of a substantially water-soluble component is greater than 0.05 moles/100 mL, e.g., greater than about 0.10 moles/100 mL., the oxides such as molybdenum trioxide, molybdenum blue, also identified as molybdenum pentoxide, tungstic oxide, etc.; the acids, e.g., molybdic, tungstic and chromic acids; metal salts such as the ammonium, alkali and alkaline earth metals, e.g., ammonium heptamolybdate, ammonium phosphomolybdate, ammonium paratungstate; and the complex salts of Group VIB and Group VIII metals such as complex cobalt and nickel phosphomolybdates.

The phosphorus-containing acidic component is substantially water soluble, preferably a water soluble, acidic component that may be an oxygenated inorganic phosphorus-containing acid such as phosphoric acid although any one or more of the phosphoric acids may be used, including orthophosphoric acid, metaphosphoric acid, pyrophosphoric acid, triphosphoric acid and tetraphosphoric acid and mixtures thereof. For the purposes of the invention, substantial phosphorus water solubility means sufficient solubility to react with the substantially water-insoluble Group VIII metal component. Additionally, a soluble salt of phosphoric acid, such as the ammonium phosphates may also be used. Phosphoric acid may be added to the solution in liquid or solid form. A preferred compound is orthophosphoric acid ($H_3PO_4$) in a highly concentrated aqueous solution, although any suitable form of phosphoric acid or precursor thereof, e.g., phosphorus pentoxide ($P_2O_5$) may be utilized. Naturally, concentrated acid may be appropriately diluted for use or an appropriate form of dilute acid may be used directly.

Should it be desired to supplement the composition with an acid, e.g., in order to adjust the pH, other suitable, water-soluble acids can be used, such as a hydroxy monocarboxylic acid, a polyhydroxy monocarboxylic acid, a hydroxy polycarboxylic acid, a polyhydroxy polycarboxylic acid, a monocarboxylic acid, etc.

The catalyst composition typically comprises (on a dry weight basis) about 5 to about 50 wt % of the total of Group VIB and Group VIII metal components, calculated as oxides based on the total weight of the catalyst composition; preferably, about 8 to about 45 wt %, more preferably about 10 to about 40 wt %. The amount of Group VIB metals and Group VIII metals can be determined using atomic absorption spectrometry (AAS), inductively-coupled plasmaspectrometer (ICP) analysis and/or x-ray fluorescence (XRF).

Examples of suitable foraminous carrier materials include silica, silica gel, silica-alumina, alumina, titania, titania-alumina, zirconia-alumina, zirconia, boria, terrana, kaolin, magnesium silicate, magnesium carbonate, magnesium oxide, aluminum oxide, precipitated aluminum oxide, activated alumina, bauxite, kieselguhr, pumice, natural clays, synthetic clays, cationic clays or anionic clays such as saponite, bentonite, kaolin, sepiolite or hydrotalcite, and mixtures thereof. Preferred foraminous carrier components are silica, silica-alumina, alumina, titania, titania-alumina, zirconia, bentonite, boria, and mixtures thereof; silica, silica-alumina, and alumina are especially preferred. Alumina can be prepared, e.g., by converting an alumina precursor such as boehmite, into a preferred carrier material gamma-alumina.

As described above, in the catalyst compositions according to the invention, the metal components are converted partly or wholly into their sulfides. This can be accomplished by introducing the catalyst comprising the impregnated metals in a device or reactor and conducting a suitable pre-sulfurization treatment, wherein the catalyst is sulfurized by introducing a petroleum or hydrocarbon oil containing an appropriate sulfurizing agent at elevated temperature. In that case, it is preferred for the catalyst to be essentially free from Group VIII metal disulfides. This step is typically carried out at the time that the catalyst is put into use for conducting hydroprocessing operations. However, catalysts of the prior art containing a chelating agent wherein the catalyst had not been calcined after impregnation typically contained high residual moisture. Such moisture presented an undue burden on the process. That limitation is substantially overcome by the catalysts prepared according to the methods of the present invention.

Embodiments of the present invention include:

(I) A stabilized composition adapted for use in impregnating catalyst carriers comprising: (A) water; (B) catalytically active metals being in the form of and comprising: (1) at least one component providing at least one metal from Group VIB of the periodic table; and (2) at least one component providing at least one metal from Group VIII of the periodic table; wherein (i) the Group VIII metal is provided by a substantially water insoluble component; (ii) the molar ratio of the Group VIII metal to Group VIB metal is about 0.05 to about 0.75, provided that the amount of the Group VIII metal is sufficient to promote the catalytic effect of the Group VIB metal; and (iii) the concentration of the Group VIB metal, expressed as the oxide, is at least about 3 to about 50 weight percent based on the weight of the composition; and (C) at least one water soluble, phosphorus-containing acidic component in an amount sufficient to provide an elemental phosphorus to Group VIB metal molar ratio of about 0.01 to less than about 0.80. If it is desired to prepare a low metal concentration catalyst, the stabilized aqueous impregnating composition can have a relatively dilute concentration of the Group VIB metal expressed as the oxide, for example, from about 3 to about 6 weight percent; for example, about 3.5 to about 5.5 weight percent. In contrast, where a higher metal content catalyst is desired, the impregnating composition, expressed as the oxide, can contain about 15 to about 50 weight percent of the Group VIB metal; for example, about 18 to about 46 weight percent; or about 21 to about 42 weight percent. Other useful compositions are found within the range of about 3 to about 50 weight percent of the Group VIB metal including, for example, 7-27, 8-30, 10-24 as well as concentrations in the range of about 12 to about 48 weight percent; for example about 13 to about 40 weight percent. Useful molar ratios of the Group VIII metal to Group VIB metal are about 0.05 to about 0.75; or about 0.15 to about 0.65; for example, about 0.20 to about 0.60. Furthermore, the molar ratio of elemental phosphorus to Group VIB metal can be about 0.01 to about 0.80; or about 0.05 to about 0.76; for example, about 0.09 to about 0.72.

The impregnating solution prepared in the sequence described in detail below is surprisingly stable and can be stored for an extended period of time until needed to prepare the catalyst. The composition can be stable for periods in excess of hours, days and weeks, even periods in excess of a month or more.

Where a catalyst is desired having a higher concentration of Group VIII metal, e.g., nickel, the aqueous impregnating solution can be supplemented with a nickel component in soluble form. In that case, the total amount of Group VIII metal is increased and the molar ratio of Group VIII metal to Group VIB metal can typically range from about 0.05 to about 1.0; preferably about 0.15 to about 0.9; more preferably about 0.15 to about 0.8. As will be later described, the additional, soluble Group VIII metal component can be included in the aqueous impregnating solution or, preferably, added as an aqueous solution to the combination of foraminous carrier and impregnating composition described above.

The stable aqueous impregnating solution described in (I) above can be employed in a process for preparing the catalyst of the present invention as follows: A mixture is prepared using the impregnating solution of (I), optionally a quantity of additional Group VIII metal component in soluble form where the catalyst is to contain a higher level of the Group VIII metal than is available in (I) and a calcined foraminous powder. It should be appreciated that alternative variations are also feasible. For example, the soluble Group VIII metal component could be combined with (I) to provide the total amount of such metal required and that mixture could constitute one feed component. Alternatively, the calcined foraminous carrier could be combined with the soluble Group VIII metal component and that mixture could be combined with (I) in the desired quantity. Alternative convenient arrangements will be apparent to a person skilled in the art. The just-described components are fed to a mixer, for example, a short residence time, low energy mixer or a higher energy mixing device in order to combine these components. The carrier can be impregnated by various methods well known to those skilled in the art. For example, the "incipient wetness" or "dip-soak" techniques can be employed; the dip-soak method is preferred. In the incipient wetness method, the volume of the metals-containing solution is adjusted, usually by adding additional water, such that the volume is substantially the same as the pore volume of the carrier. In the dip-soak method the carrier is dipped at least once into a concentrated metals-containing solution (also containing the chelating agent). The concentrations and relative ratios of the metals and chelating agent in the first and subsequent dips can be adjusted in order to achieve the concentration of each of the metals and chelating agent that is desired in the final catalyst. In the dip-soak method the impregnated carrier is separated from the final solution, for example by draining, and in both techniques the impregnated carrier is then heat treated at elevated temperature but in the absence of calcination.

The method used to prepare the aqueous composition of (I) above is unique in that it results in a stable composition, as described, even though the amount of phosphorus-containing acidic component, e.g., phosphoric acid, is insufficient to effect dissolution of the substantially water insoluble Group VIII metal component when the two are combined. Another embodiment of the method can be generally described as follows:

A method of preparing stabilized aqueous compositions for use in impregnating catalyst carriers to produce catalysts useful in chemically refining hydrocarbons, comprising adding to a suitable quantity of water: (A) a suitable amount of at least one chelating agent; (B) at least one substantially water insoluble Group VIII metal component to produce a slurry; (C) at least one substantially water soluble, phosphorus-containing acidic component in an amount insufficient to cause dissolution of the Group VIII metal component so as to produce a slurry and combining the slurry with; (D) at least one Group VIB metal component; (E) mixing the combination of (A), (B), (C) and (D) and, heating the mixture, for a time and to a temperature sufficient for (A), (B), (C) and (D) to form a solution; and (F) adding an additional amount of water, if required, to obtain solution concentrations of the at least one Group VIII metal, the at least one Group VIB metal and phosphorus useful for impregnating the carrier; wherein Group VIB and Group VIII refer to Groups of the periodic table of the elements. Useful amounts, concentrations and ratios of the components are as further described in (I) above. Typically, mixing and heating is carried out over a period of about 0.5 to about 16 hours; preferably about 1 to about 8 hours; more preferably about 1 to about 4 hours; at a temperature typically about 150 to about 220° F.; preferably about 160 to about 200° F.; more preferably about 180 to about 190° F.

Complexing or chelating agents suitable for use in the present invention are typically organic compounds and preferably include hydroxycarboxylic acids, especially those that contain one or more carboxyl groups and one or more hydroxyl groups, for example, glycolic acid, hydroxypropionic acid, hydroxybutyric acid, hydroxyhexanoic acid, tartaric acid, malic acid, glyceric acid, citric acid, gluconic acid, saccharic acid, mandelic acid and the like. Other useful chelating agents include those having chemical functional groups such as alcohol, including ethylene glycol, glycerol, ethanol amine, poly ethylene glycol, hydroquinone; amine, including ethylenediamine, ethylenediamine-tetraacetic acid; sulfhydryl group, as found in the amino acid cysteine; carboxyl groups in a variety of chemical substances: gluconic acid, pyridine-2,3-dicarboxylic acid, thiophene-2-carboxylic acid, mercaptosuccinic acid, nicotinic acid; amino acid, including alanine, methionine; sugar, including lactose; and ketone, including acetone-1,3-dicarboxylic acid.

The amount of the chelating agent, preferably at least one hydroxycarboxylic acid, to be added to the catalyst is typically about 0.05 to about 5 molar times of the total number of moles of the metals of Group VIB and Group VIII; preferably about 0.15 to about 4; more preferably about 0.2 to about 3. At concentrations significantly less than about 0.05 molar times, it is insufficient for forming a suitable complex of the active metals. However, at concentrations significantly greater than 5 molar times, further improvement in activity is not likely but there is a risk that the chelating agent can precipitate thereby clogging the pores of the carrier. While it is desired to avoid substantial degradation or decomposition of the chelating agent during high temperature heating, it may be desirable to use an excess of the chelating agent, for example, citric acid, over and above the level desired in the final catalyst in order to compensate for the loss of chelating agent that may occur during elevated temperature heating, such as by decomposition. For purposes of the present invention avoiding substantial decomposition means retaining, after heating, about 85% of the chelate, for example citric acid, incorporated on or in the carrier or in combination with the metals; preferably retaining about 90%; more preferably retaining about 95% of the citric acid. Such excess can be about 1 wt % to about 10 wt %; preferably about 2 wt % to about 8 wt %; more preferably about 3 wt % to about 6 wt %; alternatively about 3 wt % to about 5 wt %.

The catalysts of the present invention are prepared by methods previously believed by those skilled in the art not to be available. In particular, a carrier, specifically a calcined foraminous carrier, is impregnated with an aqueous composition comprising a mixture of active metals and chelating agent, preferably at least one hydroxycarboxylic acid, and optionally a phosphorus-containing acidic component. If the impregnation method results in an excess volume of solution compared to the pore volume of the carrier (such as where the "dip-soak" method is used), the impregnated carrier is separated from the liquid, for example, by draining. If impregnation is carried out using the "incipient wetness" method where little or no excess solution is present, it is not necessary to drain the impregnated carrier. In the next step the impregnated carrier is placed in a heated environment, for example on a moving bed that passes through an oven, a rotary calciner or any other convenient environment or vessel well-known to those skilled in the art. The wet, impregnated catalyst is then heated to a temperature higher than 200° C. (392° F.), but less than a temperature that would result in significant or substantial degradation of the organic chelating agent. In other words, the functional integrity of the chelating agent is substantially maintained. A minor level of degradation of the chelating agent can be tolerated.

Various criteria can be used to ascertain a suitable heating time for the impregnated carrier in order to achieve the benefits of the present invention. While it can be desirable to do so, it is not necessary to dry the catalyst to the extent that all moisture is removed since doing so may require excessively long drying time at low temperature or excessive degradation of the chelating agent at elevated temperatures. Furthermore, the temperature of the heating medium, typically air although other gasses, for example inert gasses such as nitrogen or carbon dioxide, can be used as a measure of the temperature to which the impregnated catalyst is heated. In some instances, such as when the catalyst is heated for a short time and/or the layer of catalyst is relatively thick, the temperature of the catalyst may not be the same as that of the heating medium. In such circumstances the temperature of the heating medium can be used as a proxy for the temperature of the catalyst and alternative criteria, such as discussed below can be used to ascertain when a suitable catalyst is obtained. In one embodiment the catalyst is typically heated to a temperature higher than 200° C. or 392° F.; preferably equal to or greater than about 395° F.; more preferably equal to or greater than about 398° F.; still more preferably equal to or greater than about 400° F.; most preferably about 400° F. to about 420° F.; alternatively about 400° F. to about 415° F.; or about 400° F. to about 410° F.; and in each instance under conditions of time and temperature such that substantial decomposition of the chelating agent, for example citric acid, is avoided. Naturally, longer heating times are feasible at the lower temperatures of those recited, but typically heating is carried out for a period of time less than about 1 hour; preferably less than about 30 minutes; more preferably less than about 10 minutes, and in each instance greater than about 1, 2, 3, 4 or 5 minutes and for a total time at the selected temperature as appropriate to accomplish the benefits as further described below.

One criterion for establishing that a suitable catalyst has been obtained is to measure the weight percent loss on ignition (LOI) of the catalyst following preparation. LOI is a measure of the total volatiles present in the sample, essentially water and the organic chelating agent. The LOI test is conducted by subjecting a sample to an oxygen-containing atmosphere for 1 hour at 1020° F. (548.9° C.), thereby oxidizing or igniting the organic matter and driving off all residual moisture in the catalyst. However, the temperature of the test is believed not to be sufficiently high to affect the inorganic components. Catalysts prepared according to the present invention have been observed to have LOI values typically less than about 20 wt %; preferably less than about 19 wt %; more preferably less than about 18 wt %; for example from about 15 wt % to about 20 wt %; or about 16 wt % to about 20 wt %. Naturally the LOI value will be affected by the type and amount of the specific chelating agent added as well as the residual moisture in the catalyst. Consequently, LOI values lower than 15 wt % may be achievable using the methods of the present invention, for example, as low as about 12, 13 or 14 wt % to about 20 wt % In each instance, the level of LOI achieved should be such that the amount of chelating agent desired in the finished catalyst has not been significantly adversely reduced, either through degradation and/or volatilization as a result of the heating process, but a significant amount of most of the residual water present in the wet catalyst following impregnation has been driven off. As discussed above, it is desirable to retain about 85% to about 95% of the chelate in or on the catalyst after heating. Compared to catalysts having the same composition and prepared in the same way except heated to the lower temperatures of the prior art, the catalysts of the present invention typically exhibit a moisture content that is about one-third to about one-fourth the prior art catalyst. Expressing the LOI criterion in another way, the LOI value following heating and compared to the wet catalyst soon after preparation is typically about 50% lower; preferably about 56% lower; more preferably about 60% lower; still more preferably about 65% lower; for example, about 65% to about 70% lower or more.

A further alternative criterion for characterizing a suitable catalyst prepared according to the methods of the present invention is to directly or indirectly measure the water content of the catalyst after heating. The catalyst of the present invention can exhibit a moisture content of about 3 wt % to about 6 wt %; for example about 3.0 wt % to about 5 wt %; alternatively about 3.5 wt % to about 5 wt %; for example 3.75 wt % to about 4.75 wt %. The methods of the present invention can achieve a reduction, compared to a "wet" catalyst soon after preparation, of greater than about 85%; preferably greater than about 87%; more preferably greater than about 90%; for example, desirably a reduction of about 85% to about 90%, or more. In comparison, a catalyst of the same composition prepared in the same manner but heated to about 250° F. exhibits an estimated moisture content of about 8 wt %, equivalent to only about a 70% reduction in moisture. Catalysts prepared according to the methods of the present invention can be expected to exhibit significantly reduced water content compared to catalysts prepared without elevated heating. For example, water content in the catalysts prepared according to the present methods that is less than 25% of that in product prepared according to prior art methods; an improvement ranging from about 15% to about 35% can be expected; alternatively about 25% to about 33%.

The catalysts according to the invention are particularly useful in hydrocarbon conversion processes comprising contacting a hydrocarbon feedstock with a particulate catalyst under conditions of elevated temperature and elevated pressure with hydrogen, wherein the catalyst is made according to the present invention. As generally described, such catalysts comprise at least one catalytically active metal from Group VIB of the periodic table, at least one catalytically active metal from Group VIII of the periodic table, and phosphorus and a chelating agent, wherein the metals, phosphorus and chelating agent are carried on a foraminous carrier, and wherein the catalyst exhibits a reduced moisture level, e.g., about 4 wt % or possibly less.

Catalysts prepared according to the present invention can be used in virtually all hydroprocessing processes to treat a plurality of feeds under wide-ranging reaction conditions, generally, for example, at temperatures in the range of about 200° to about 500° C., hydrogen pressures in the range of about 5 to 300 bar, and liquid hourly space velocities (LHSV) in the range of about 0.05 to 10 h$^{-1}$. The term "hydroprocessing" can encompass various processes in which a hydrocarbon feed is reacted with hydrogen at elevated temperature and elevated pressure (hydroprocessing reaction conditions), including hydrogenation, hydrodesulfurization, hydrodenitrogenation, hydrodemetallization, hydrodearomatization, hydroisomerization, hydrodewaxing, hydrocracking, and hydrocracking under mild pressure conditions, which is also referred to as mild hydrocracking.

More specifically, "hydroprocessing" as the term is employed herein means oil refinery processes for reacting petroleum feedstocks (complex hydrocarbon mixtures) with hydrogen under pressure in the presence of a catalyst to lower: (a) the concentration of at least one of sulfur, contaminant metals, nitrogen, aromatics and Conradson carbon, present in said feedstock, and (b) at least one of the viscosity, pour point, and density of the feedstock. In addition, color of the resulting oil may be improved. Hydroprocessing includes hydrocracking, isomerization/dewaxing, hydrofinishing, and hydrotreating processes which differ by the amount of hydrogen reacted and the nature of the petroleum feedstock treated.

Hydrofinishing is typically understood to involve the hydroprocessing of hydrocarbonaceous oil containing predominantly (by weight of) hydrocarbonaceous compounds in the lubricating oil boiling range ("feedstock") wherein the feedstock is contacted with solid supported catalyst at conditions of elevated pressure and temperature for the purpose of saturating aromatic and olefinic compounds and removing nitrogen, sulfur, and oxygen compounds present within the feedstock, and to improve the color, odor, thermal, oxidation, and UV stability, properties of the feedstock.

Hydrocracking is typically understood to involve the hydroprocessing of predominantly hydrocarbonaceous compounds containing at least five (5) carbon atoms per molecule ("feedstock") which is conducted: (a) at superatmospheric hydrogen partial pressure; (b) at temperatures typically below 593.3° C. (1100° F.); (c) with an overall net chemical consumption of hydrogen; (d) in the presence of a solid supported catalyst containing at least one (1) hydrogenation component; and (e) wherein said feedstock typically produces a yield greater than about one hundred and thirty (130) moles of hydrocarbons containing at least about three (3) carbon atoms per molecule for each one hundred (100) moles of feedstock containing at least five (5) carbon atoms per molecule.

Hydrotreating is typically understood to involve the hydroprocessing of predominantly hydrocarbonaceous compounds containing at least five carbon atoms per molecule ("feedstock") for the desulfurization and/or denitrification of said feedstock, wherein the process is conducted: (a) at superatmospheric hydrogen partial pressure; (b) at temperatures typically below 593.3° C. (1100° F.); (c) with an overall net chemical consumption of hydrogen; and (d) in the presence of a solid supported catalyst containing at least one hydrogenation component.

Isomerization/dewaxing is typically understood to involve hydroprocessing predominantly hydrocarbonaceous oil having a Viscosity Index (VI) and boiling range suitable for lubricating oil ("feedstock") wherein said feedstock is contacted with solid catalyst that contains, as an active component, microporous crystalline molecular sieve, at conditions of elevated pressure and temperature and in the presence of hydrogen, to make a product whose cold flow properties are substantially improved relative to said feedstock and whose boiling range is substantially within the boiling range of the feedstock.

For the treatment of hydrocarbon distillates, the operating conditions would typically comprise a hydrogen partial pressure within the range of about 100 psia (13 atm) to about 3,000 psia (204 atm); an average catalyst bed temperature within the range of about 500° F. (260° C.) to about 800° F. (426° C.); a LHSV within the range of about 0.25 volume of hydrocarbon per hour per volume of catalyst to about 10 volumes of hydrocarbon recycle rate or hydrogen addition rate within the range of about 300 SCFB (53.4 Nm$^3$/m$^3$) to about 8,000 SCFB (1,424 Nm$^3$/m$^3$). Preferred operating conditions for the hydrotreating of hydrocarbon distillates comprise a hydrogen partial pressure within the range of about 200 psia (13 atm) to about 2,000 psia (135 atm); an average catalyst bed temperature within the range of about 550° F. (288° C.) to about 750° F. (398° C.); a LHSV within the range of about 0.5 volume of hydrocarbon per hour per volume of catalyst to about 5 volumes of hydrocarbon per hour per volume of catalyst; and a hydrogen recycle rate or hydrogen addition rate within the range of about 500 SCFB (89 Nm$^3$/m$^3$) to about 6,000 SCFB (1,069 Nm$^3$/m$^3$).

The most desirable conditions for conversion of a specific feed to a predetermined product, however, can be best obtained by converting the feed at several different temperatures, pressures, space velocities and hydrogen addition rates, correlating the effect of each of these variables and selecting the best compromise of overall conversion and selectivity. The catalyst composition of the invention is particularly suitable for hydrotreating hydrocarbon feedstocks, in particular feedstocks with less than 50 liquid volume % boiling above about 1050° F. (565.6° C.) as determined by ASTM D1160 distillation.

EXAMPLES

Example 1

(A) A cobalt-containing catalyst solution is prepared as follows: (1) add 500 ml of water to an appropriate flask equipped with stirrer; (2) add 71.9 grams of anhydrous citric acid; and (3) add 156.7 grams of cobalt carbonate (46% cobalt). Slowly add 57.5 grams of phosphoric acid (85%) followed by 501.3 grams of molybdenum trioxide and begin heating to about 190° F. to 200° F. Heat at least at 190° F. for at least 2.5 hours until the solution clears. Once the solution is clear it is cooled to below 130° F. and 251.6 grams of citric acid are added and the mixture is stirred until the solution is clear. Thereafter the solution is cooled to room temperature and diluted. The final $MoO_3$ concentration is 0.50 grams per ml of solution. The amounts described provide for an excess of citric acid of about 3 wt % since the heating step that follows can degrade or decompose a portion of the added citric acid and the excess can insure that the desired amount is present in the final catalyst composition. If no excess is used, the second addition of citric acid is reduced to 241.5 grams (for a total addition of 313.4 grams). The solution exhibits the following component ratios: citric acid/(CoO+$MoO_3$) (mol/mol): (with an excess)=0.36; and (without an excess)=0.35. Analysis of the resulting catalyst showed the following composition (metals expressed as the oxides; concentration in wt % on a dry basis): CoO, 4.4 wt %; $P_2O_5$, 1.7 wt %; $MoO_3$, 24.0 wt %.

(B) A nickel-containing catalyst solution is prepared as follows: (1) add 450 ml of water to a flask equipped with stirrer; (2) add 107.8 grams of anhydrous citric acid; and (3) add 160.4 grams of cobalt carbonate (49% nickel). Slowly add 77.1 grams of phosphoric acid (75%) and heat to 170° F. Add 501.3 grams of molybdenum trioxide and continue heating to about 210° F. for at least 3 hours until the solution clears and after clearing cool to below 130° F. Add 77.1 grams of phosphoric acid (75%) and 251.6 grams of citric acid. Stir until the solution is clear, cool to room temperature and dilute to 1000 ml. The final concentration of $MoO_3$ is 0.50 grams per ml of solution. As above for the cobalt containing solution, the amounts described provide for an excess of citric acid of about 4 wt % since the heating step that follows can degrade or decompose a portion of the added citric acid and the excess can insure that the desired amount is present in the final catalyst composition. If no excess is used, the second addition of citric acid is reduced to 236.6 grams (for a total addition of 344.5 grams). Analysis of the resulting catalyst showed the following composition (metals expressed as the oxides; concentration in wt % on a dry basis): NiO, 5.0; $P_2O_5$, 4.2; and $MoO_3$, 25.0. The solution exhibits the following component ratios: The solution contains the following component ratios: citric acid/(NiO+$MoO_3$) (mol/mol): (with an excess)=0.39; and (without an excess)=0.37.

The metals-containing solution of (A) is contacted with an alumina carrier and the solution of (B) with a 3% silica/alumina carrier having the following characteristics: Surface Area ($m^2$/gm), (A) 300, (B) 310; $N_2$ Pore Volume (cc/gm), (A) 0.70, (B) 0.80; Loss on Ignition (wt % @ 1020° F.), (A) <3.0, (B) <2.0; and water pore volume (A) 0.8, (B) 0.9.

(C) A cobalt-containing catalyst is prepared using malic acid as the chelating agent as follows: add 450 ml of water to a flask equipped with stirrer. With stirring, add 60 grams of malic acid, 158.1 grams of cobalt carbonate, and 57.5 grams of 85% phosphoric acid and heat to about 170° F. Add 500 grams of molybdenum trioxide and heat to 190-200° F. Continue heating for about 2 hours. Cool the solution to below 130° F. and add 163 grams of malic acid. Stir until solution clears. Cool and dilute to 1000 ml with water. The concentration of MoO3 is 0.5 grams/ml of solution. The metals-containing solution is contacted with a 3% silica/alumina carrier having the following characteristics: Surface Area ($m^2$/gm), 292; $N_2$ Pore Volume (cc/gm), 0.80; Loss on Ignition (wt % @ 1020° F.), <2.0.

(D) In this preparation, 200 grams of the carrier described above were contacted with 147.1 ml of the solution from Example (C) and 20.9 ml of water. Analysis also showed 25.6% MoO3, 4.8% CoO, and 2.0% P2O5 on a dry weight basis. The resulting material was dried at about 400-410° F. as described above. Analysis of the catalyst showed 15.7% LOI.

(E) A cobalt-containing catalyst was prepared as follows: add 400 ml of water to a 2000 ml flask equipped with stirrer. Add 90 grams citric acid and 117.2 grams of cobalt hydroxide. Begin heating and add 57.5 grams of 85% phosphoric acid. Add 500 grams of molybdenum trioxide. Heat the resulting mixture to 200° F. Continue heating at 200° F. for at least 2 hours. Cool the solution to 100° F. and add 226 grams of citric acid. Stir until solution clears. Cool and dilute to 1000 ml with water. The concentration of $MoO_3$ is 0.5 grams/ml of solution.

(F) The solution from Example (E) was used to impregnate metals and a chelate on a carrier by the dip-soak method.

|  | Dip 1 | Dips 2+ |
| --- | --- | --- |
| Carrier Weight (gm) | 175.0 | 175.0 |
| Metals Solution Weight (gm) | 981 | 185 |
| Diluted Volume of Metals Solution (ml) | 780 | 780 |
| Composition: |  |  |
| Finished Catalyst (dry weight basis) |  |  |
| Wt % CoO | 3.0 | 3.4 |
| Wt % MoO3 | 25.9 | 24.2 |
| Wt % P2O5 | 2.8 | 2.3 |

The product from each dip is transferred to a rotary calciner and dried to about 400° F. as described above. Analysis of the catalyst showed the following composition: 23.5% MoO3, 4.1% CoO, and 2.0% P2O5 on a dry weight basis. A sample taken after several dips was dried as described above and exhibited an LOI of 14.0%.

(G) Metals are added to the carrier by various methods, including the incipient wetness and dip-soak methods. For the incipient wetness method 200 grams of support are used. A volume of metals solution is used such that when applied to the support the target oxides will be achieved. Prior to contacting the metals solution with the support the metals solution is diluted with water such that the resulting solution is equal to the water pore volume of the support. The metals solution is contacted with the support for 1 hour. The resulting material is placed in a rotary calciner, which has been preheated to 320° F. The mixture is held at 320° F. for 10 minutes. The material is heated under flowing air as the temperature is ramped up (such heating can take about 30 to about 40 minutes). When the catalyst bed temperature reaches about 400° F., it is held at 400° F. to 420° F. for less than or equal to 10 minutes and then immediately cooled to room temperature.

Using the dip-soak method in the laboratory, 175 grams of support are used and the total diluted dip solution is 780 ml. In the first dip the metals solution is the most concentrated. In subsequent dips only enough metals solution is added to match the theoretical amount needed to target the desired metals' loading on the carrier. The support is placed in a basket with mesh sides and bottom to allow the solution to penetrate. The following results are based on the first four dips of a nickel-containing catalyst preparation. The basket containing the support is immersed in the diluted metals solution for 50 minutes and during this time the solution is recirculated through the basket to ensure good contact with the support. The basket is removed from the solution and the material is allowed to drain for 20 minutes. The material is then transferred to a rotary calciner and dried as described in the pore volume method. In each dip, except the first, the weight of the metals solution is the theoretical amount of metals needed to reach the target oxide levels for 175 grams of carrier.

|  | Dip 1 | Dip 2 | Dip 3 | Dip 4 |
|---|---|---|---|---|
| Carrier Weight (gm) | 175.0 | 175.0 | 175.0 | 175.0 |
| Metals Solution Weight (gm) | 997.1 | 221 | 221 | 221 |
| Diluted Volume of Metals Solution (ml) | 780 | 780 | 780 | 780 |
| Composition: Finished Catalyst (dry weight basis) | | | | |
| Wt % NiO | 3.5 | 3.8 | 3.9 | 4.0 |
| Wt % MoO$_3$ | 25.3 | 25.5 | 24.6 | 24.3 |
| Wt % P$_2$O$_5$ | 5.6 | 5.4 | 5.2 | 5.1 |

(H) Additional catalysts were prepared as described above by either incipient wetness or dip-soak method. Metals ratios vary to demonstrate that the method of making the catalyst solutions is flexible for different amounts of raw materials. Catalysts that were dried at about 400° F. exhibit LOI values of less than about 16 wt % whereas catalysts that were dried at the lower temperature exhibit LOI values of greater than 20 wt %.

| Catalyst | Impregnation Method | Heating ° F. | LOI Wt % | MoO$_3$ Wt % | P$_2$O$_5$ Wt % | CoO Wt % | NiO Wt % |
|---|---|---|---|---|---|---|---|
| I | Dip-Soak | 410 | 15.5 | 24.4 | 4.7 | | 4.1 |
| II | Incipient Wetness | >400 | 13.3 | 21.8 | 1.5 | 4.2 | — |
| III | Dip-Soak | 405 | 16.1 | 25.5 | 4.9 | — | 4.5 |
| IV | Incipient Wetness | <250 | 22.9 | 17.4 | 5.8 | — | 5.3 |
| V | Dip-Soak | <250 | 20.9 | 23.4 | 1.7 | 4.2 | — |

Example 2

A sample of the cobalt-containing supported catalyst prepared as in Example 1 was removed after it was prepared and tested for Loss on Ignition (LOI), a measure of the total volatiles present in the sample, essentially water and the organic chelating agent. The LOI test is conducted by subjecting a sample to an oxygen-containing atmosphere for 1 hour at 1020° F. (548.9° C.). A further sample of the original wet catalyst was placed in a rotary calciner and heated to progressively higher temperatures up to 400° F. (204.4° C.). Small portions of the catalyst were removed during heat-up and analyzed for weight loss by LOI and carbon content (wt %) using the "Leco" test instrument (LECO Corporation, Joseph, Mich.). In this test method an aliquot of sample is placed in a ceramic crucible which is heated to over 2000° F. in a stream of pure oxygen. The carbon is combusted to carbon dioxide and the oxygen-carbon dioxide gas mixture is passed into an Infrared detector where the carbon dioxide content is measured. The percent carbon for the sample is automatically calculated by the analyzer. Initially, the catalyst was placed in the rotary calciner at 175° F. After 1.5 hours a sample was taken for analysis. The temperature was increased to 250° F. and held for 0.5 hour and a further sample was taken for analysis. The temperature was then raised to 300° F. and held for 0.5 hour after which a sample was taken for analysis. This was repeated at 350° F. and finally at 400° F. For the samples subjected to the LOI test, temperature was measured in the catalyst bed; for the carbon content test, in the furnace wall. The test results are shown in the following table.

| Drying Temperature (° F.)/(° C.) | Loss on Ignition (wt %) | Carbon (wt %) |
|---|---|---|
| None (as made, wet) | 39.5 | 2.80 |
| 175/79.4 | 27.2 | 3.11 |
| 250/121.1 | 20.3 | 3.33 |
| 300/148.9 | 17.5 | 3.71 |
| 350/176.7 | 15.6 | 3.70 |
| 400/204.4 | 13.6 | 3.67 |

It can be seen that as the heating temperature was increased the LOI values decreased indicating that the moisture was substantially driven off, and at the highest temperatures the volatiles content appears to be approaching a constant value. Extrapolating the data to about 450° F., a temperature at which essentially all of the moisture would be removed, it appears that the catalyst prepared in this example would have about 12 wt % of a material that can be lost on ignition and such material is likely the hydroxycarboxylic acid component, citric acid. Based on the above data and assuming that little, if any, of the chelating agent is lost during the heating process, the methods of the present invention can remove about 96 wt % of the moisture originally present in the sample whereas the method of the prior art, in which a catalyst is typically heated to about 250° F., results in removal of only about 48.6 wt % moisture. Further, it can be seen that the carbon content values reached a fairly constant level, especially at the higher temperatures where less moisture was present in the samples.

These data suggest that moisture can be substantially removed from a catalyst sample without significant loss of the hydroxycarboxylic component by judicious control of the heating conditions, particularly temperature.

Example 3

For this comparison test, cobalt-containing catalyst samples prepared as described in Example 1 were heated to about 250° F. (121.1° C.) for about 10 minutes. The sample for high temperature treatment was then ramped up to about 410° F. (210° C.) and held at this temperature for about 10 minutes, then cooled rapidly. The overall treatment time (including heat up and cool down) for the high temperature sample was about 1 hour. Temperatures were measured by a thermocouple in the catalyst bed during drying. The catalyst samples were then used for evaluating hydrodesulfurization (HDS) and hydrodenitrogenation (HDN) performance with a hydrocarbon oil. Test conditions and results are shown in the following table.

| Test conditions | Value |
|---|---|
| Feed | |
| Total pressure, psig | Straight Run (SR) Diesel |
| | 800 |
| LHSV | 1.5 |
| H2/Oil, SCFB | 1200 |
| Feedstock | |
| API gravity | 33.7 |

-continued

| | | |
|---|---|---|
| Sulfur, wt % | | 0.57 |
| Nitrogen, ppm | | 221 |

| | Heating Conditions | |
|---|---|---|
| Test Results* | 250° F. | 410° F. |
| RVA HDS | 100 | 100 |
| RVA HDN | 100 | 96 |

*RVA = Relative Volume Activity based on the rate constant for the indicated process, HDS or HDN.

It can be seen that catalyst performance was essentially unaffected, but the catalyst containing a lower level of moisture would be much preferred in use since it could be used substantially as received or with significantly less effort to remove unwanted moisture prior to processing feedstock.

Example 4

Five hydroprocessing catalysts prepared according to the methods of the present invention were tested in order to characterize the volatile compounds evolved when each was heated to 200° C. (392° F.). The major gases generated were water vapor and carbon dioxide.

Catalyst Identification (1) Cobalt-containing catalyst according to the composition described in Example 1. Catalyst bed temperature during the heating step=411° F.; LOI=15.4 wt %

(2) Same as (1) LOI=17.3 wt %

(3) Cobalt-containing catalyst sample according to the composition described in Example 1, but in the absence of further heating; LOI=22.6 wt %

(4) Same as (3) LOI=22.7 wt %

(5) Same as (3) LOI=23.5 wt %

Analytical Methodology

Volumetric Karl Fischer titration was used to identify and quantify the species evolved as the catalysts were heated following their preparation. Karl Fischer titration was conducted as follows: approximately 1 gram of each catalyst was introduced to a gas-tight oven under constant reducing gas sweep (about 100 cc/min) The sweep gas passed through a midget ethylene glycol scrubber to trap evolved moisture and a portion of the glycol was titrated with Karl Fischer reagent at 30 minute intervals. The oven temperature was initially set at 100° C. and gas-scrubbed for 1 hour, at which time temperature was increased to 200° C. for 1 hour at the higher temperature.

Observations and Results

Karl Fischer Titration: When heated to 100° C. the high temperature treated catalyst samples yielded approximately one-quarter the weight of water as compared to low temperature treated samples, whereas further heating at 200° C. the difference decreased to 1:3 (see Tables 1 and 2 below). Citric acid reduction made a significant contribution to the amount of water evolved when the samples were heated at 200° C. In all cases for both catalyst types a greater amount of water was generated during the first 30 minutes at each temperature as compared to the second 30 minute segment.

TABLE A

Wt % Water by Karl Fischer Titration-Cumulative Versus Time

| | Cumulative Wt % Water Evolved | | | |
|---|---|---|---|---|
| Catalyst | 0-30 min at 100° C. | 30-60 min at 100° C. | 60-90 min At 200° C. | 90-120 min at 200° C. |
| (1) | 0.9 | 1.4 | 2.9 | 3.6 |
| (2) | 0.6 | 1.1 | 3.3 | 4.2 |
| (3) | 2.5 | 4.6 | 8.9 | 9.5 |
| (4) | 2.8 | 5.3 | 9.5 | 10.4 |
| (5) | 3.7 | 5.5 | 9.1 | 11.4 |

TABLE B

Wt % Water by Karl Fischer-Per Time/Temperature Segment

| | Wt % Water Evolved per Time Segment | | | |
|---|---|---|---|---|
| Catalyst | 0-30 min at 100° C. | 30-60 min at 100° C. | 60-90 min at 200° C. | 90-120 min at 200° C. |
| (1) | 0.9 | 0.5 | 1.5 | 0.7 |
| (2) | 0.6 | 0.5 | 2.2 | 0.9 |
| (3) | 2.5 | 2.1 | 4.4 | 0.6 |
| (4) | 2.8 | 2.5 | 4.1 | 0.9 |
| (5) | 3.7 | 1.8 | 3.6 | 2.3 |

The test results clearly demonstrate that the catalyst preparation methods of the present invention produce a catalyst having a significantly reduced level of moisture, particularly when the catalyst samples are subjected to a level of heating following preparation that drives off moisture for analytical purposes but does not cause additional degradation of the incorporated citric acid.

Example 5 (Comparative)

Three hydroprocessing catalysts prepared without additional heating at elevated temperature (samples heated to 200-250° F.) were tested in order to characterize the composition and volatile compounds present in the samples. These results provide compositional reference points for comparative purposes.

| | Catalyst Sample | | |
|---|---|---|---|
| | Cobalt | Nickel | Nickel |
| Chelate Test | Citric Acid | None | Citric Acid |
| Wt % Carbon (a) | 4.5 | 0.06 | 5.0 |
| Wt % as Citric Acid (b) | 12.0 | 0.16 | 13.3 |
| Wt % Water-TKF (c) | 6.6 | 9.5 | 7.3 |
| Wt % Water-CKF (c) | 7.3 | 10.3 | 7.7 |
| Total Volatiles @600° C. (d) | 22 | 14 | 24 |
| Total Volatiles @1000° C. (d) | 29 | 27 | 35 |

(a) Wt % Carbon by CHN Analyzer
(b) Wt % Citric Acid = Wt % Carbon × 2.668
(c) Catalysts extracted with dry methanol and the extracts analyzed by Karl Fischer techniques: T = titrimetric; C = coulometric
(d) Total volatiles at temperature for 4 hours These data confirm that catalyst samples prepared according to the prior art include relatively high amounts of moisture.

All documents described herein are incorporated by reference herein, including any priority documents and/or testing procedures. The principles, preferred embodiments, and modes of operation of the present invention have been described in the foregoing specification. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Further, any range of numbers recited in the specification or paragraphs hereinafter describing various aspects of the invention, such as that representing a particular set of properties, units of measure, conditions, physical states or percentages, is intended to literally incorporate expressly herein by reference or otherwise, any number falling within such range, including any subset of numbers or ranges subsumed within any range so recited.

The invention claimed is:

1. A method for preparing a hydroprocessing catalyst comprising:
   (I) providing at least the following components:
      (A) at least one calcined foraminous carrier having a water pore volume;
      (B) catalytically active metals useful in hydroprocessing hydrocarbons, said metals in the form of at least one component providing at least one metal from Group VIB of the periodic table and at least one component providing at least one metal from Group VIII of the periodic table;
      (C) at least one chelating agent;
      (D) water in a quantity sufficient to form a solution or dispersion comprising said catalytically active metals and said at least one chelating agent; and
      (E) optionally, at least one phosphorus containing acidic component;
   (II) contacting said components (I)(A) with said solution or dispersion comprising (I)(B), (I)(C), (I)(D) and optionally (I)(E) for a time and at a temperature sufficient to form a mixture and to impregnate said carrier with a suitable amount of said components (I)(B) and (I)(C) and optionally (I)(E);
   (III) to the extent that the volume of said solution or dispersion equals or exceeds the water pore volume of said carrier separating said impregnated carrier from said excess solution or dispersion; and
   (IV) heating said impregnated carrier to a temperature of 204° C. (400° F.) to 216° C. (420° F.) for a period of time less than about 1 hour.

2. The method of claim 1, wherein said at least one metal from Group VIB is selected from the group consisting of molybdenum and tungsten and wherein said at least one metal from Group VIII is selected from the group consisting of cobalt and nickel.

3. The method of claim 1, wherein said chelating agent is selected from the group consisting of hydroxycarboxylic acids, ethylene glycol, glycerol, ethanolamine, polyethylene glycol, hydroquinone, ethylenediamine, ethylenediamine tetraacetic acid, cysteine, alanine, methionine, gluconic acid, pyridine-2,3-dicarboxylic acid, thiophene-2-carboxylic acid, mercaptosuccinic acid, nicotinic acid, lactose, and acetone-I,3-dicarboxylic acid.

4. The method of claim 3, wherein said at least one hydroxycarboxylic acid is selected from the group consisting of glycolic acid, hydroxypropionic acid, hydroxybutyric acid, hydroxyhexanoic acid, tartaric acid, malic acid, glyceric acid, citric acid and gluconic acid.

5. The method of claim 1, wherein said foraminous carrier is at least one member selected from the group consisting of silica, silica gel, silica alumina, alumina, Mania, titania alumina, zirconia-alumina, zirconia, boria, terrana, kaolin, magnesium silicate, magnesium carbonate, magnesium oxide, activated carbon, aluminum oxide, precipitated aluminum oxide, activated alumina, bauxite, kieselguhr, pumice, natural clays, synthetic clays, cationic clays, anionic clays and mixtures thereof.

6. The method of claim 1, wherein said heating is carried out for a time and temperature sufficient to provide a catalyst exhibiting a moisture content of about 3 wt % to about 6 wt %.

7. The method of claim 1, wherein: (A) the molar ratio of said Group VIII metal to Group VIB metal is about 0.05 to about 0.75, and wherein said Group VIII metal component is provided by a substantially water insoluble component; or (B) wherein said at least one phosphorus containing acidic component is substantially water soluble and is present in an amount sufficient to provide an elemental phosphorus to Group VIB metal molar ratio of about 0.01 to about 0.80.

8. The method of claim 1, wherein said heating is carried out for a time and temperature sufficient to provide a catalyst exhibiting a loss in weight on ignition (LOI) of less than about 20 wt %.

9. The method of claim 1, wherein said heating is carried out for a time and temperature sufficient to provide a catalyst exhibiting a reduction in moisture content, compared to the wet catalyst following preparation of greater than 90% and wherein the catalyst is not calcined following heating.

10. The method of claim 1, wherein the amount of hydroxycarboxylic acid on the impregnated foraminous carrier prior to heating exceeds the amount desired in the catalyst after heating by about 1 wt % to about 10 wt %.

11. A hydroprocessing catalyst prepared by the method of claim 1.

12. The hydroprocessing catalyst prepared according to the method of claim 1, wherein said at least one chelating agent comprises about 0.05 to about 5 times the molar amount of said catalytically active metals; and wherein said catalyst exhibits a moisture content of about 3 wt % to about 6 wt %.

13. The catalyst of claim 12, wherein said chelating agent is at least one hydroxycarboxylic acid.

14. The catalyst of claim 12, useful in hydroprocessing a petroleum feed, wherein said hydroprocessing is selected from the group consisting of hydrogenation, hydrodesulfurization, hydrodenitrogenation, hydrodemetallization, hydrodearomatization, hydroisomerization, hydrodewaxing, hydrocracking, and hydrocracking under mild pressure conditions.

15. The catalyst of claim 12, useful in hydrodesulfurization and hydrodenitrogenation of hydrocarbons.

* * * * *